US012677137B2

(12) United States Patent
Hong

(10) Patent No.: US 12,677,137 B2
(45) Date of Patent: Jul. 7, 2026

(54) METHOD AND APPARATUS FOR OBTAINING CAPABILITY INFORMATION, AND METHOD AND APPARATUS FOR SENDING CONFIGURATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 316 days.

(21) Appl. No.: 18/283,778

(22) PCT Filed: Mar. 24, 2021

(86) PCT No.: PCT/CN2021/082777
§ 371 (c)(1),
(2) Date: Sep. 22, 2023

(87) PCT Pub. No.: WO2022/198506
PCT Pub. Date: Sep. 29, 2022

(65) Prior Publication Data
US 2024/0179515 A1 May 30, 2024

(51) Int. Cl.
*H04W 8/24* (2009.01)
*H04W 88/06* (2009.01)
(52) U.S. Cl.
CPC .............. *H04W 8/24* (2013.01); *H04W 88/06* (2013.01)

(58) Field of Classification Search
CPC ....... H04W 8/24; H04W 8/183; H04W 24/10; H04W 48/12; H04W 88/06
See application file for complete search history.

(56) References Cited

U.S. PATENT DOCUMENTS

| | | | | |
|---|---|---|---|---|
| 9,294,141 | B2 * | 3/2016 | Challa ................. | H04W 68/025 |
| 9,820,159 | B2 * | 11/2017 | Ghasemzadeh ..... | H04W 72/044 |
| 2010/0120410 | A1 | 5/2010 | Fan et al. | |
| 2012/0057525 | A1 | 3/2012 | Hou | |

(Continued)

FOREIGN PATENT DOCUMENTS

| | | |
|---|---|---|
| CN | 101951287 A | 1/2011 |
| CN | 110463249 A | 11/2019 |

(Continued)

OTHER PUBLICATIONS

International Search Report issued in Application No. PCT/CN2021/082777, dated Dec. 22, 2021 with English translation, (5p).

(Continued)

*Primary Examiner* — Akwasi M Sarpong
*Assistant Examiner* — Gabrielle N Dai
(74) *Attorney, Agent, or Firm* — Arch & Lake LLP; Hao Tan; Shen Wang

(57) ABSTRACT

The present disclosure provides a method for obtaining capability information, including: receiving configuration information from a first base station; in response to being in an idle state, receiving broadcast information from a second base station according to a configuration in the configuration information; and determining capability information of the second base station with respect to solving a multi-card problem according to the broadcast information.

17 Claims, 10 Drawing Sheets

(56)          References Cited

U.S. PATENT DOCUMENTS

2015/0057046 A1     2/2015  Challa et al.
2018/0042054 A1     2/2018  Han
2018/0146365 A1*    5/2018  Dhanapal ............. H04W 8/183

FOREIGN PATENT DOCUMENTS

CN          110495208  A     11/2019
CN          112352456  A      2/2021
EP            3998809  A1     5/2022
EP            4021040  A1     6/2022
WO         2021029730  A1     2/2021
WO         2021031213  A1     2/2021

OTHER PUBLICATIONS

Search Report for EP Application No. 21932134.6 dated Apr. 23, 2024, (10p).

* cited by examiner

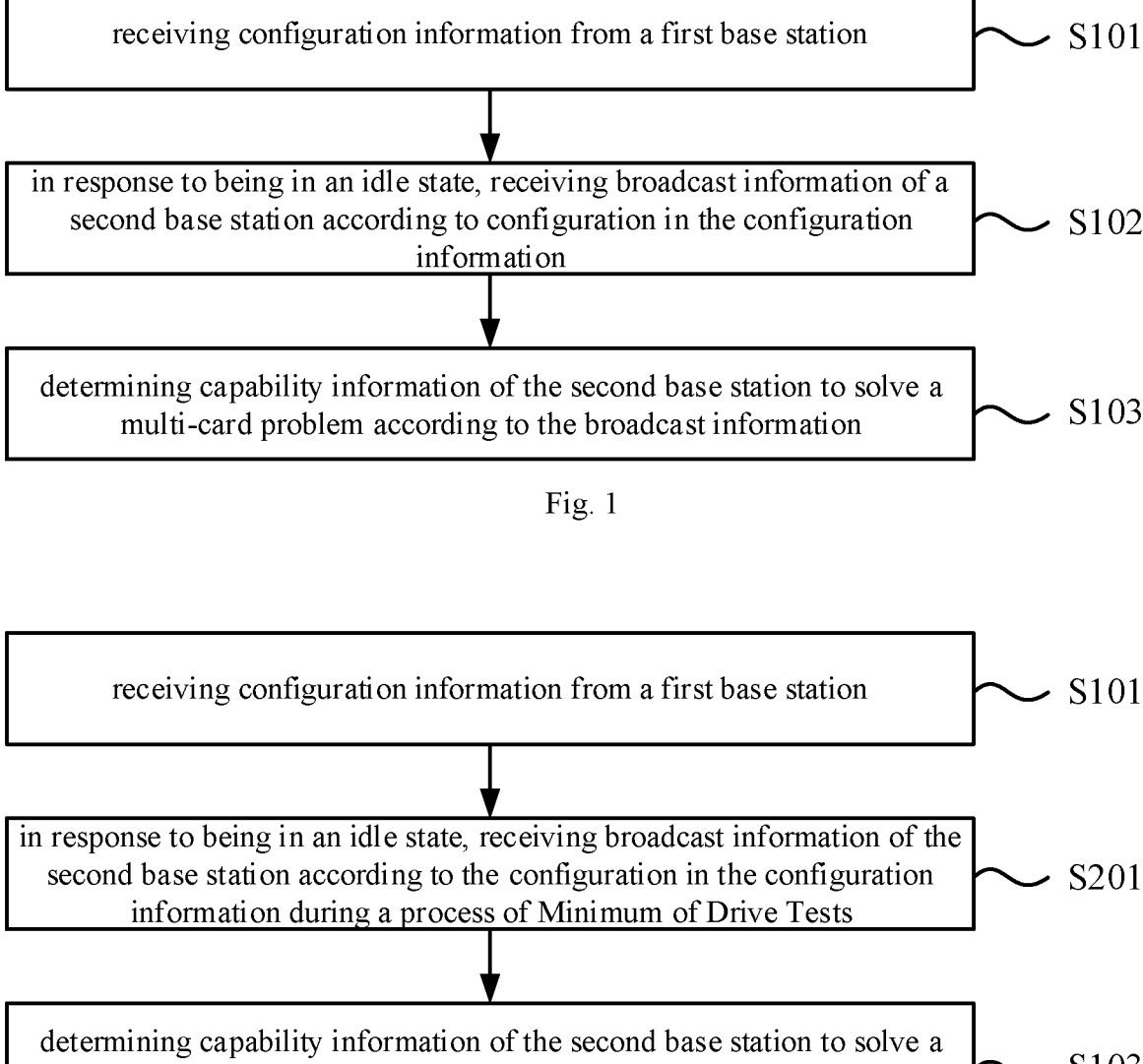

receiving configuration information from a first base station    S101 in response to being in an idle state, receiving broadcast information of a second base station according to configuration in the configuration information    S102 determining capability information of the second base station to solve a multi-card problem according to the broadcast information    S103

Fig. 1 receiving configuration information from a first base station    S101 in response to being in an idle state, receiving broadcast information of the second base station according to the configuration in the configuration information during a process of Minimum of Drive Tests    S201 determining capability information of the second base station to solve a multi-card problem according to the broadcast information    S103

Fig. 2

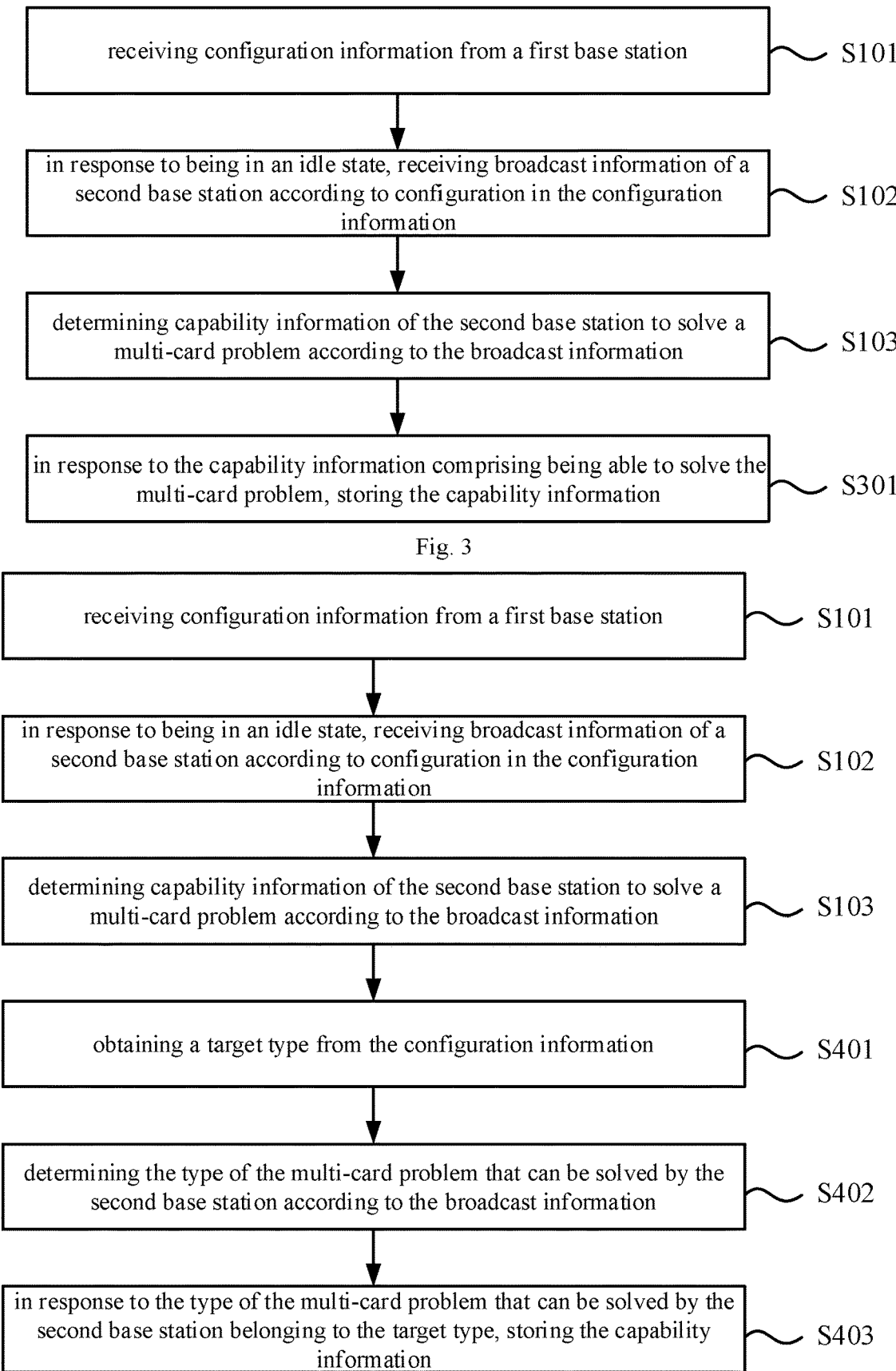

receiving configuration information from a first base station — S101 in response to being in an idle state, receiving broadcast information of a second base station according to configuration in the configuration information — S102 determining capability information of the second base station to solve a multi-card problem according to the broadcast information — S103 in response to the capability information comprising being able to solve the multi-card problem, storing the capability information — S301

Fig. 3 receiving configuration information from a first base station — S101 in response to being in an idle state, receiving broadcast information of a second base station according to configuration in the configuration information — S102 determining capability information of the second base station to solve a multi-card problem according to the broadcast information — S103 obtaining a target type from the configuration information — S401 determining the type of the multi-card problem that can be solved by the second base station according to the broadcast information — S402 in response to the type of the multi-card problem that can be solved by the second base station belonging to the target type, storing the capability information — S403

Fig. 4

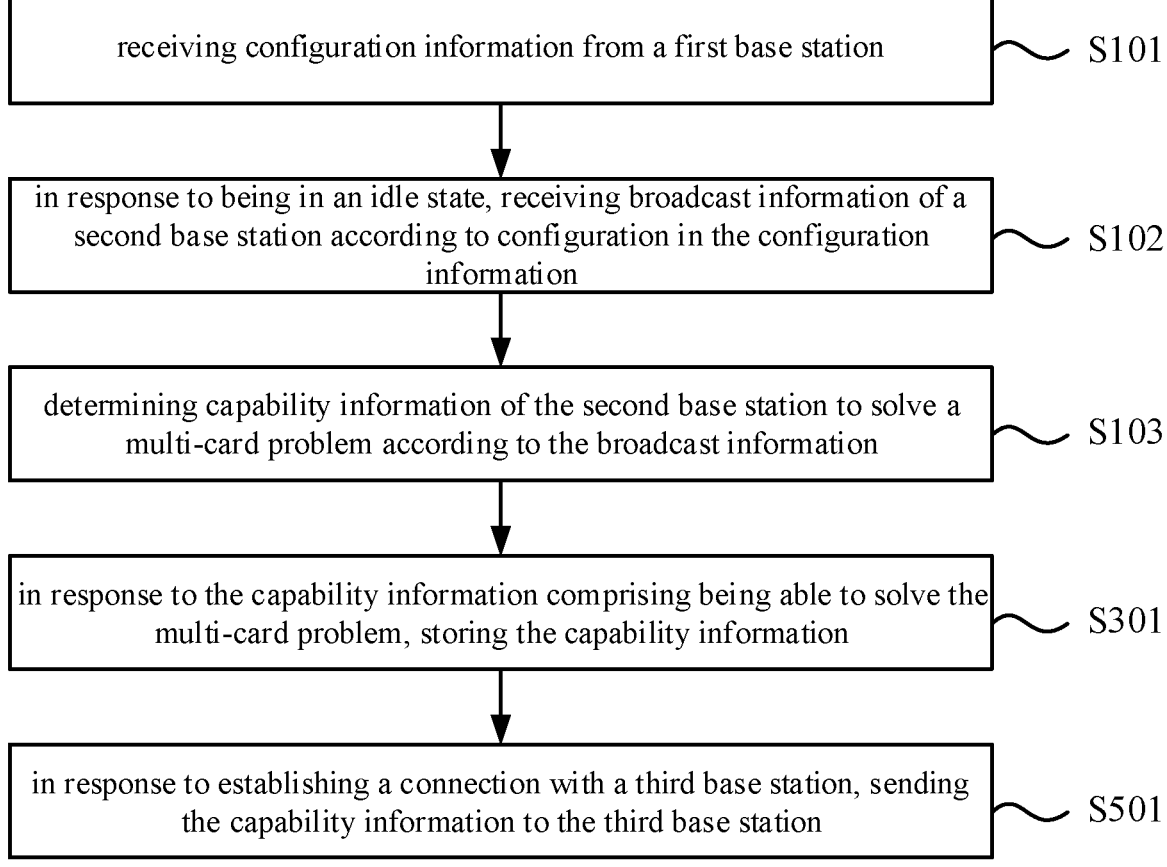

receiving configuration information from a first base station ⟶ S101 in response to being in an idle state, receiving broadcast information of a second base station according to configuration in the configuration information ⟶ S102 determining capability information of the second base station to solve a multi-card problem according to the broadcast information ⟶ S103 in response to the capability information comprising being able to solve the multi-card problem, storing the capability information ⟶ S301 in response to establishing a connection with a third base station, sending the capability information to the third base station ⟶ S501

Fig. 5

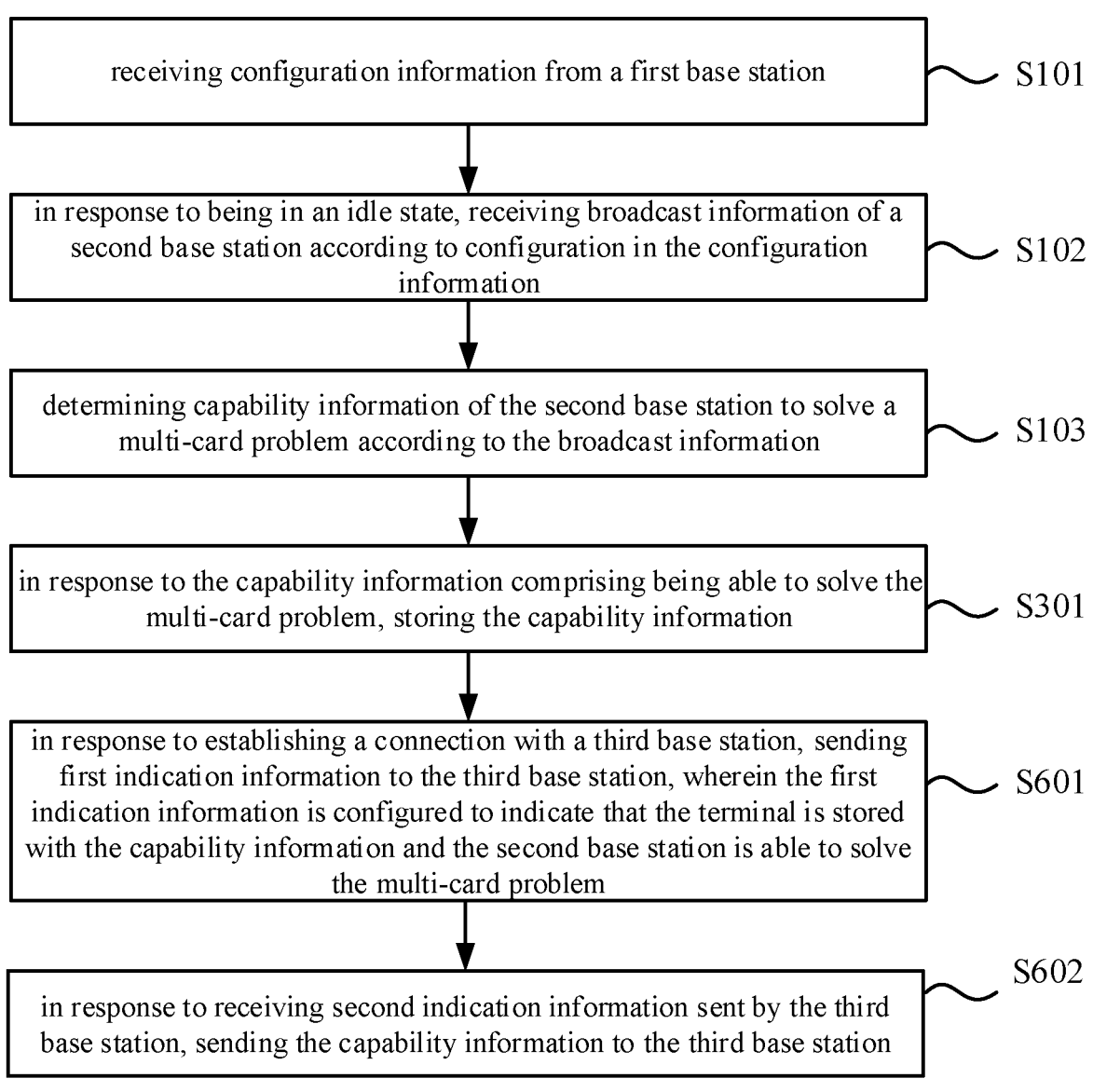

receiving configuration information from a first base station    ⌇ S101 in response to being in an idle state, receiving broadcast information of a second base station according to configuration in the configuration information    ⌇ S102 determining capability information of the second base station to solve a multi-card problem according to the broadcast information    ⌇ S103 in response to the capability information comprising being able to solve the multi-card problem, storing the capability information    ⌇ S301 in response to establishing a connection with a third base station, sending first indication information to the third base station, wherein the first indication information is configured to indicate that the terminal is stored with the capability information and the second base station is able to solve the multi-card problem    ⌇ S601 in response to receiving second indication information sent by the third base station, sending the capability information to the third base station    ⌇ S602

Fig. 6 sending configuration information to a terminal, wherein the configuration information includes configuration, and is used by the terminal to receive broadcast information of a second base station according to the configuration and determine capability information of the second base station to solve a multi-card problem according to the broadcast information, when the terminal is in an idle state    ⌇ S701

Fig. 7

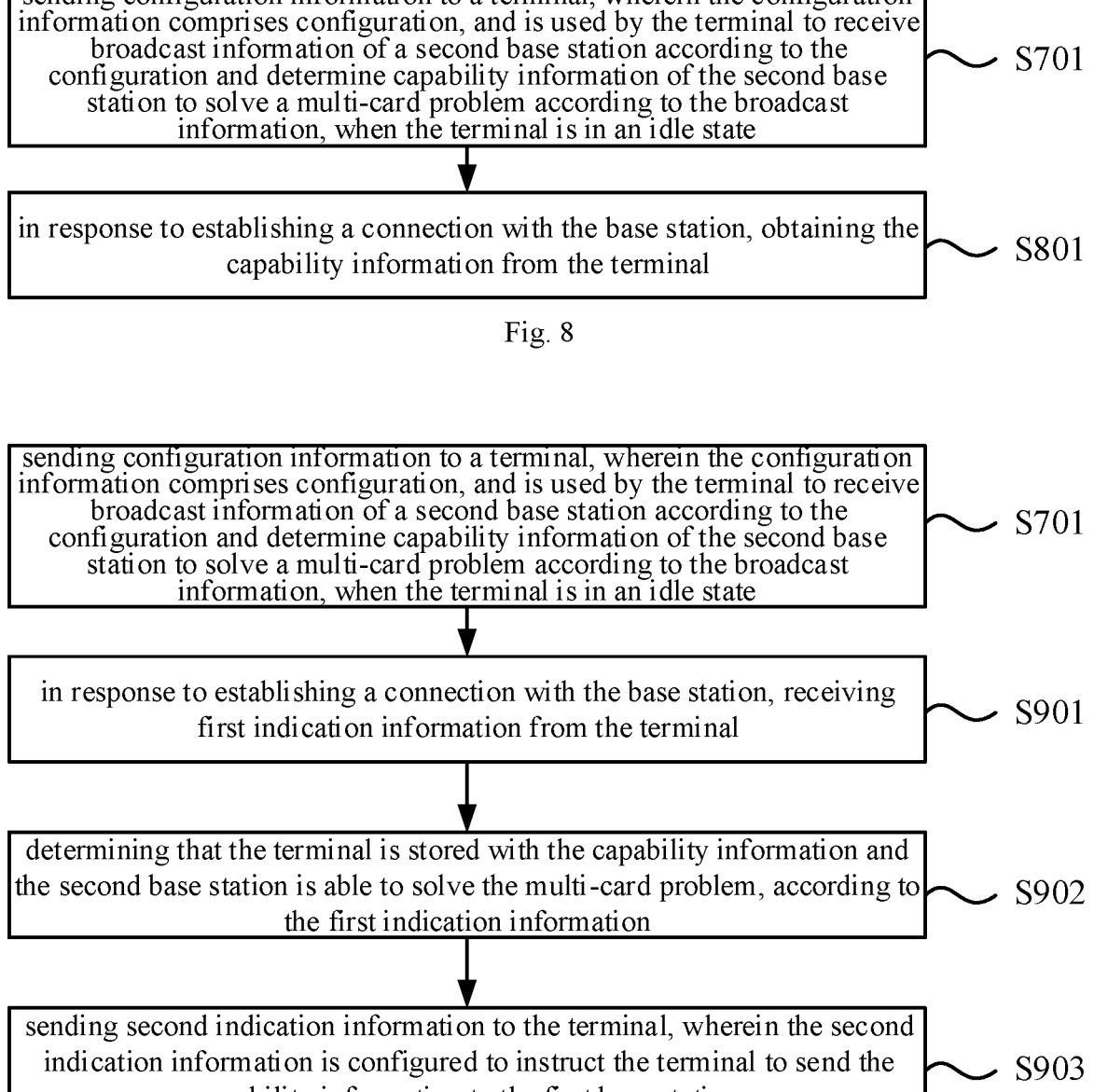

sending configuration information to a terminal, wherein the configuration information comprises configuration, and is used by the terminal to receive broadcast information of a second base station according to the configuration and determine capability information of the second base station to solve a multi-card problem according to the broadcast information, when the terminal is in an idle state          ⌇ S701 in response to establishing a connection with the base station, obtaining the capability information from the terminal          ⌇ S801

Fig. 8 sending configuration information to a terminal, wherein the configuration information comprises configuration, and is used by the terminal to receive broadcast information of a second base station according to the configuration and determine capability information of the second base station to solve a multi-card problem according to the broadcast information, when the terminal is in an idle state          ⌇ S701 in response to establishing a connection with the base station, receiving first indication information from the terminal          ⌇ S901 determining that the terminal is stored with the capability information and the second base station is able to solve the multi-card problem, according to the first indication information          ⌇ S902 sending second indication information to the terminal, wherein the second indication information is configured to instruct the terminal to send the capability information to the first base station          ⌇ S903

Fig. 9

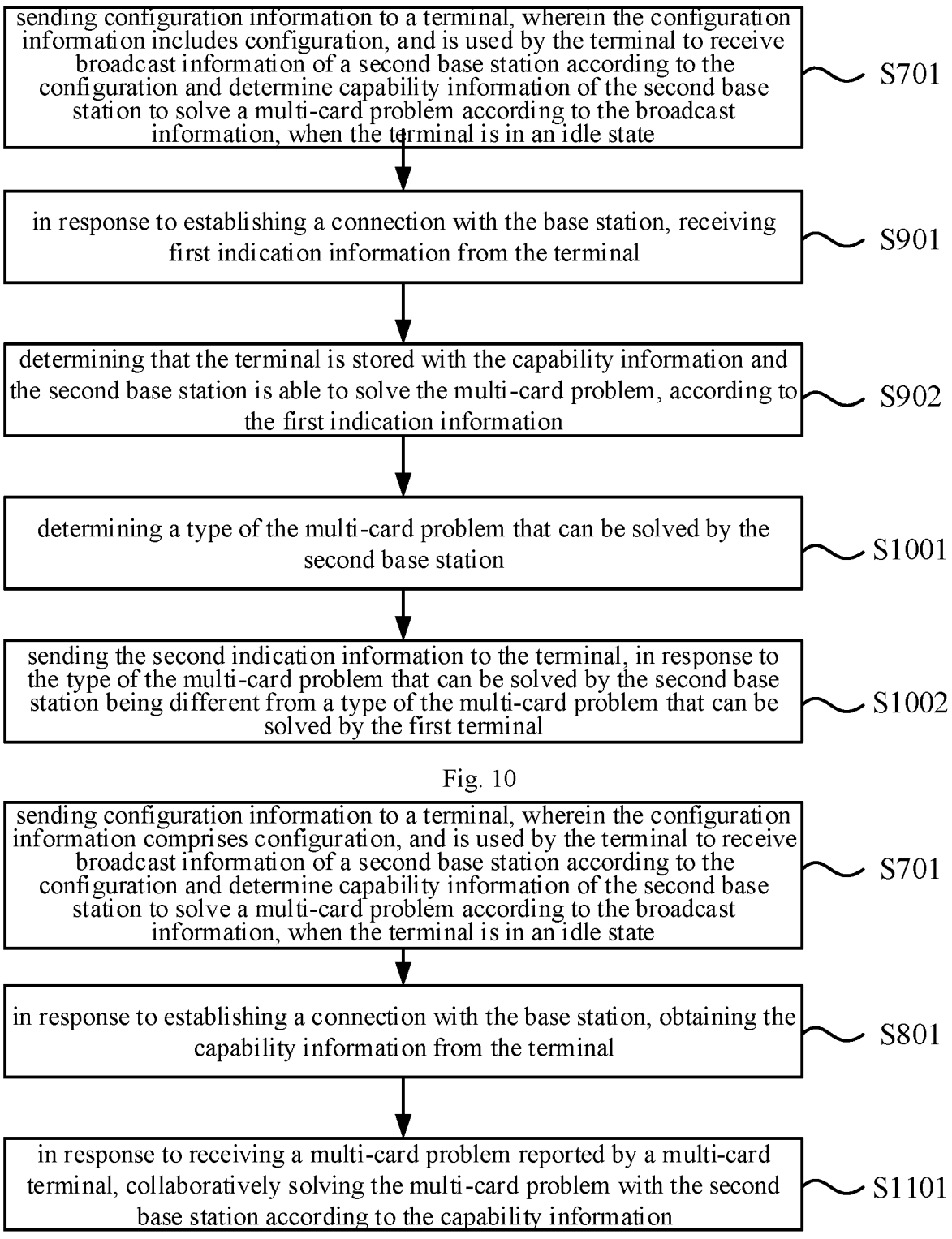

sending configuration information to a terminal, wherein the configuration information includes configuration, and is used by the terminal to receive broadcast information of a second base station according to the configuration and determine capability information of the second base station to solve a multi-card problem according to the broadcast information, when the terminal is in an idle state          S701 in response to establishing a connection with the base station, receiving first indication information from the terminal          S901 determining that the terminal is stored with the capability information and the second base station is able to solve the multi-card problem, according to the first indication information          S902 determining a type of the multi-card problem that can be solved by the second base station          S1001 sending the second indication information to the terminal, in response to the type of the multi-card problem that can be solved by the second base station being different from a type of the multi-card problem that can be solved by the first terminal          S1002

Fig. 10 sending configuration information to a terminal, wherein the configuration information comprises configuration, and is used by the terminal to receive broadcast information of a second base station according to the configuration and determine capability information of the second base station to solve a multi-card problem according to the broadcast information, when the terminal is in an idle state          S701 in response to establishing a connection with the base station, obtaining the capability information from the terminal          S801 in response to receiving a multi-card problem reported by a multi-card terminal, collaboratively solving the multi-card problem with the second base station according to the capability information          S1101

Fig. 11

METHOD AND APPARATUS FOR OBTAINING CAPABILITY INFORMATION, AND METHOD AND APPARATUS FOR SENDING CONFIGURATION

CROSS-REFERENCE TO RELATED APPLICATION

This application is the US national phase application of International Application No. PCT/CN2021/082777, filed on Mar. 24, 2021, the entire contents of which are incorporated herein by reference for all purposes.

TECHNICAL FIELD

The disclosure relates to the field of communication technologies, and in particular, to a method for obtaining capability information, a method for sending configuration, an apparatus for obtaining capability information, an apparatus for sending configuration, a communication device and a computer readable storage medium.

BACKGROUND

In a multi-card terminal, multiple SIM (Subscriber Identity Module) cards can be provided, and the terminal can communicate through multiple SIM cards. However, during the communication process, communication conflicts may occur between multiple SIM cards, affecting the communication effect of the terminal.

SUMMARY

According to embodiments of a first aspect of the present disclosure, a method for obtaining capability information is provided. The method is performed by a terminal, and includes:

receiving configuration information from a first base station;

in response to determining that the terminal is in an idle state, receiving broadcast information from a second base station according to configuration in the configuration information; and determining capability information of the second base station to solve a multi-card problem according to the broadcast information.

According to embodiments of a second aspect of the present disclosure, a method for sending configuration is provided. The method is performed by a first base station, and includes:

sending configuration information to a terminal, wherein the configuration information includes configuration, and is used by the terminal to receive broadcast information from a second base station according to the configuration, and determine capability information of the second base station to solve a multi-card problem according to the broadcast information, when the terminal is in an idle state.

According to embodiments of a third aspect of the present disclosure, a communication device is provided, and includes:

a processor; and a memory, configured to store instructions executable by the processor, wherein the processor is configured to implement the method for obtaining capability information, and/or the method for sending configuration described above.

BRIEF DESCRIPTION OF THE DRAWINGS

In order to provide a clearer explanation of the technical solution in embodiments of the present disclosure, a brief introduction will be given to the accompanying drawings required in the description of the embodiments. Obviously, the accompanying drawings in the following description are only some embodiments of the present disclosure. For ordinary technicians in the art, other accompanying drawings can be obtained based on these drawings without any creative effort.

FIG. 1 is a schematic flowchart of a method for obtaining capability information according to an embodiment of the present disclosure.

FIG. 2 is a schematic flowchart of another method for obtaining capability information according to an embodiment of the present disclosure.

FIG. 3 is a schematic flowchart of yet another method for obtaining capability information according to an embodiment of the present disclosure.

FIG. 4 is a schematic flowchart of yet another method for obtaining capability information according to an embodiment of the present disclosure.

FIG. 5 is a schematic flowchart of yet another method for obtaining capability information according to an embodiment of the present disclosure.

FIG. 6 is a schematic flowchart of yet another method for obtaining capability information according to an embodiment of the present disclosure.

FIG. 7 is a schematic flowchart of a method for sending configuration according to an embodiment of the present disclosure.

FIG. 8 is a schematic flowchart of another method for sending configuration according to an embodiment of the present disclosure.

FIG. 9 is a schematic flowchart of yet another method for sending configuration according to an embodiment of the present disclosure.

FIG. 10 is a schematic flowchart of yet another method for sending configuration according to an embodiment of the present disclosure.

FIG. 11 is a schematic flowchart of yet another method for sending configuration according to an embodiment of the present disclosure.

DETAILED DESCRIPTION

Figure 12:
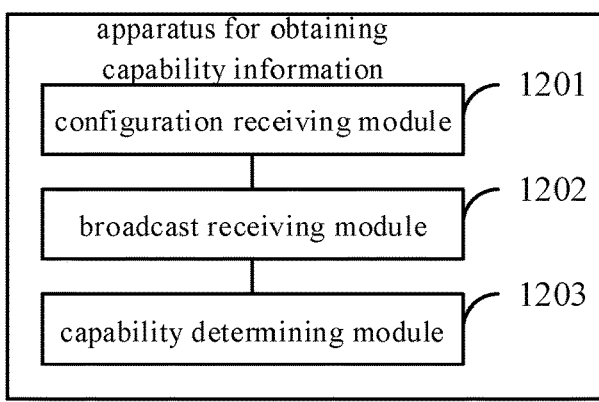
FIG. 12 is a schematic block diagram of an apparatus for obtaining capability information according to an embodiment of the present disclosure.

The following will provide a clear and complete description of the technical solution in embodiments of the present disclosure in conjunction with the accompanying drawings. Obviously, the described embodiments are only a part of embodiments of the present disclosure, not all of them. Based on the embodiments in this disclosure, all other embodiments obtained by ordinary technical personnel in the art without creative labor fall within the scope of protection in this disclosure.

FIG. 1 is a schematic flowchart of a method for obtaining capability information according to an embodiment of the present disclosure. The method for obtaining capability information shown in this embodiment can be applied to a terminal, which may be a multi-card terminal or a non multi-card terminal. The terminal includes but is not limited to a communication device such as a mobile phone, a tablet, a wearable device, a sensor, an Internet of Things device. The terminal can communicate with a base station as a user equipment. The base station includes but is not limited to a base station in a communication system, such as a 4G base station, a 5G base station, and a 6G base station.

In an embodiment, the base station may be a first base station applicable to the method for obtaining capability information described in any subsequent embodiment.

As shown in FIG. 1, the method for obtaining capability information may include following steps.

In step S101, configuration information is received from a first base station.

In step S102, in response to being in an idle state, broadcast information is received from a second base station according to configuration in the configuration information.

In step S103, capability information of the second base station to solve a multi-card problem is determined based on the broadcast information.

Multi-card problems include communication conflicts between multiple SIM cards. The communication conflict will affect the normal business processes of the terminal and/or base stations, generate erroneous judgments, and increase energy consumption. For example, a paging conflict between multiple SIM cards is a communication conflict. The paging conflicts include the inability of dual SIM UE to simultaneously listen to paging messages from two SIM cards, resulting in the loss of user call information. Alternatively, when SIM card 1 is undergoing data transmission, it will be interrupted by the paging of SIM card 2 and the data transmission of SIM card 1 will be interrupted. For another example, when a multi-card UE switches between two or more networks, it may result in inconsistent understanding of the Connected state between the UE and the network, which is also a communication conflict. When the multi-card UE maintains the Connected state on network A through SIM card 1, and the multi-card UE switches to network B after the multi-card UE receives a call from network B through SIM card 2, at this time, network A still considers that the multi-card UE is in the Connected state and can be scheduled, while the multi-card UE has already switched to network B and cannot be scheduled by network A. It is worth noting that the above exemplary content is only a description of the multi-card problem from the UE perspective. The multi-card problem not only affects the normal operation of UE, but also affects the operation of base stations. Taking paging conflicts as an example, if a multi-card UE receives a paging from SIM card 2 but does not respond to the paging due to SIM card 1 being in data transmission, the corresponding cell of SIM card 2 will consider that the UE has left the coverage area, leading to expanded paging and other operations, increasing the energy consumption of the base station.

In one embodiment, the first base station can send configuration information to the terminal, which includes configuration such as time domain resources, frequency domain resources, period, duration, etc. When the terminal is in an idle state, it can receive broadcast information from the second base station according to the configuration information.

In one embodiment, the second base station is a base station other than the first base station, which may include one or more base stations, for example, a base station passed along by the terminal during movement. When the terminal is within the signal coverage range of the second base station, the terminal can receive information broadcasted by the second base station.

In one embodiment, the second base station can broadcast its own capability information of solving multi-card problems, so that even when the terminal is in an idle state, it can receive the broadcast information from the second base station, and determine the capability of the second base station to solve multi-card problems based on the capability information of the second base station to solve multi-card problems obtained from the broadcast information.

In one embodiment, the second base station can not only broadcast its own capability information of solving multi-card problems, but also communicate with neighboring base stations of the second base station, obtain the capability information of neighboring base stations to solve multi-card problems, and then carry the capability information of neighboring base stations to solve multi-card problems in the broadcast information for broadcasting.

According to embodiments of the present disclosure, the terminal can obtain the capability information of the second base station to solve multi-card problems in an idle state based on the configuration of the first base station, thereby determining the capability of the second base station to solve multi-card problems.

Hence, when the terminal establishes a connection with a third base station in the future, the obtained capability information can be sent to the third base station, so that the third base station can determine the capability of the second base station to solve the multi-card problem, which facilitates the third base station and the second base station collaboratively and more effectively solving the multi-card problem for the terminal.

For example, if a terminal connected to a third base station has a multi-card problem and requests the third base station to solve the multi-card problem, the third base station can determine whether it can solve the multi-card problem. If the third base station can solve the multi-card problem, it can provide feedback to the terminal to solve the multi-card problem. If the third base station cannot solve the multi-card problem, it can determine whether the second base station can solve the multi-card problem based on the received capability information of the second base station. If the second base station can solve the multi-card problem, the third base station can instruct the terminal to switch to accessing the second base station (including but not limited to residing in the second base station and establishing a connection with the second base station).

It should be noted that solving the multi-card problem collaboratively by the third base station and the second base station is not limited to the above way. For example, after receiving a request from the terminal to solve the multi-card problem, the third base station can determine its own load. If its own load exceeds the load threshold and the second base station can solve the multi-card problem reported by the terminal, the third base station can instruct the terminal to switch to accessing the second base station, to avoid excessive load due to self-solving multi-card problems.

FIG. 2 is a schematic flowchart of another method for obtaining capability information according to an embodiment of the present disclosure. As shown in FIG. 2, in one embodiment, the configuration information is the Minimum of Drive Tests (MDT) configuration information, and receiving the broadcast information from the second base station according to the configuration information includes:

in step S201, receiving the broadcast information from the second base station according to configuration in the configuration information during the process of MDT.

In one embodiment, the base station can instruct the terminal to receive the broadcast information from the second base station through the MDT configuration information. The terminal can receive the broadcast information from the second base station according to the configuration during the process of MDT.

That is, in the process of MDT, the terminal can not only perform measurement on the second base station, for example, measure the signal quality of the second base station, but also obtain the capability information of the second base station. Thus, after the completion of MDT, the terminal can not only obtain the measurement results of the base stations along the way, but also obtain the capability information of the base stations along the way to solve multi-card problems, expanding the terminal's functions in the idle state.

In an embodiment, MDT may include two types: one is Logged MDT, and the other is Immediate MDT. The following is a description of an example with respect to Logged MDT.

In one embodiment, the configuration information may be carried in the LoggedMeasurementConfiguration signaling, which is used to indicate the configuration for MDT. For example, it may be as follows:

```
LoggedMeasurementConfiguration-r17-IEs ::=  SEQUENCE {
    MUSIMProbblemList-r17                            SetupRelease
{ MUSIMProbblemList-r17}      OPTIONAL,    --Need M
    }
``` indicating that the specific configuration information can be indicated by the information element MUSIMProblemList-r17 in the high signaling. After receiving the above signaling, the terminal can obtain the information element MUSIMProblemList-r17 from it, and then determine the configuration of receiving the broadcast information from the second base station based on the information element MUSIMProblemList-r17.

In one embodiment, the capability information includes at least one of:
being able to solve the multi-card problem;
being unable to solve the multi-card problem; or
a type of the multi-card problem that can be solved.

The terminal can determine whether the second base station can solve the multi-card problem based on the capability information. The multi-card problem includes multi-card communication conflicts, such as for a multi-card terminal, communication conflicts between the first SIM card and the second SIM card in the terminal. In the case where the second base station can solve the multi-card problem, the second base station can provide a solution for the multi-card problem reported by the terminal. In the case where the second base station can solve the multi card problem, the capability information can include the type of the multi card problem that the second base station can solve.

FIG. 3 is a schematic flowchart of yet another method for obtaining capability information according to an embodiment of the present disclosure. As shown in FIG. 3, in an embodiment, the method further includes:

in step S301, storing (also referred to as recording) the capability information, in response to the capability information comprising being able to solve the multi-card problem.

In an embodiment, the capability information of the second base station can be mainly divided into two types: being able to solve the multi-card problem and being unable to solve the multi-card problem. When the second base station cannot solve the multi-card problem, even if the capability information is stored, it will be difficult for other base stations to use in the future, and thus the capability information can not be stored. Only when the second base station can solve the multi-card problem, the capability information of the second base station can be stored, which is beneficial to avoid wasting storage space.

FIG. 4 is a schematic flowchart of yet another method for obtaining capability information according to an embodiment of the present disclosure. As shown in FIG. 4, in an embodiment, the method further includes:

in step S401, obtaining a target type from the configuration information;

in step S402, determining a type of the multi-card problem that can be solved by the second base station according to the broadcast information; and in step S403, storing the capability information in response to the type of the multi-card problem that can be solved by the second base station belonging to the target type.

In one embodiment, the first base station can indicate the target type to the terminal through the configuration information, allowing the terminal to store the capability information only when the type of multi-card problem that can be solved by the second base station belongs to the target type, thereby improving the control ability of the first base station over the terminal storing the capability information.

The type of multi-card problem solved by the second base station belonging to the target type includes two situations. One is that all types of multi-card problems solved by the second base station belong to the target type, and the other is that a part of types of multi-card problems solved by the second base station belongs to the target type. The specific situation can be configured according to needs.

In one embodiment, the target type may be a type of multi-card problem that cannot be solved by the first base station. The first base station can determine the type of multi-card problem that cannot be solved by itself as the target type among all possible types of multi-card problems, and send it to the terminal in the configuration information.

It should be noted that based on the embodiment shown in FIG. 3 above, the base station does not limit in the configuration information that the terminal can record the second base station that can solve the specific type of multi-card problem. The terminal can record the capability information of all second base stations that can solve the multi-card problem in the detected second base stations. Based on the embodiment shown in FIG. 4 above, the base station limits in the configuration information that the terminal only records the capability information of the second base station that can solve the target type of multi-card problem. The terminal only records the capability information of the second base station that can solve the target type of multi-card problem in the detected second base stations. These two configuration methods of the base station for terminals can be selected according to needs.

In one embodiment, the target type includes at least one of:

paging collision between a first SIM card and a second SIM card; or a need of switching to using a second SIM card for communication, while communicating using a first SIM card.

In one embodiment, a need of switching to using a second SIM card for communication, while communicating using a first SIM card, includes but not limited to following cases:

the communication operation of the first SIM card conflicts with monitoring the paging message by the second SIM card;

the communication operation of the first SIM card conflicts with responding to the paging message by the second SIM card;

the communication operation of the first SIM card conflicts with measuring signal of the second SIM card;

the communication operation of the first SIM card conflicts with receiving the system information of the second SIM card;

the communication operation of the first SIM card conflicts with tracking area update of the second SIM card.

It should be noted that the types of multi-card problems that can be solved by the second base station may be one or more of the above types, and will not be elaborated here.

FIG. 5 is a schematic flowchart of yet another method for obtaining capability information according to an embodiment of the present disclosure. As shown in FIG. 5, in one embodiment, the method further includes:

in step S501, in response to establishing a connection with a third base station, sending the capability information to the third base station.

In one embodiment, after establishing the connection with the third base station, the terminal can send the capability information of the second base station to solve the multi-card problem to the third base station, so that the third base station can determine the capability of the second base station to solve the multi-card problem, which is beneficial for the cooperation between the third base station and the second base station to more effectively solve the multi-card problem for the terminal.

FIG. 6 is a schematic flowchart of yet another method for obtaining capability information according to an embodiment of the present disclosure. As shown in FIG. 6, in one embodiment, sending the capability information to the third base station includes:

in step S601, sending first indication information to the third base station, wherein the first indication information is configured to indicate that the terminal stores the capability information and the second base station is able to solve the multi-card problem; and in step S602, in response to receiving second indication information sent by the third base station, sending the capability information to the third base station.

In one embodiment, during the process of establishing a connection with the third base station, or after establishing a connection with the third base station, the terminal can send the first indication information to the third base station to inform it that the terminal stores the capability information of the second base station.

For example, during the process of connecting with the third base station, the terminal sends the first indication information to the third base station. For 4G networks, the first indication information may be carried in at least one of the following Radio Resource Control (RRC) signaling:

RRC connection setup completion signaling (RRCConnectionSetupComplete);

RRC connection reconfiguration completion signaling (RRCConnectionReconfigurationComplete);

RRC connection reestablishment completion signaling (RRCConnectionReestablishmentComplete); or RRC connection resume completion signaling (RRCConnectionResumeComplete).

For 5G networks, the first indication information may be carried in at least one of the following Radio Resource Control (RRC) signaling:

RRC setup completion signaling (RRCSetupComplete);

RRC reconfiguration completion signaling (RRCReconfigurationComplete);

RRC reestablishment completion signaling (RRCReestablishmentComplete); or

RRC resume completion signaling (RRCResumeComplete).

In one embodiment, after receiving the first indication information, the third base station can determine whether to obtain the capability information of the second base station stored in the terminal according to needs. If it is determined that capability information needs to be obtained, second indication information can be sent to the terminal to instruct the terminal to send the stored capability information to the third base station. After receiving the second indication information, the terminal can then send the stored capability information to the third base station.

For example, the third base station may carry the second indication information in UEInformationRequest, which is the user equipment information request signaling. Correspondingly, the terminal may carry the capability information in UEInformationResponse, which is the user equipment information response signaling.

FIG. 7 is a schematic flowchart of a method for sending configuration according to an embodiment of the present disclosure. The method for sending configuration shown in this embodiment can be applied to a first base station, which includes but is not limited to a 4G base station, a 5G base station, and a 6G base station. The first base station can communicate with a terminal as a user equipment, which includes but is not limited to communication devices such as mobile phones, tablets, wearable devices, sensors, IoT devices, etc.

In one embodiment, the terminal may be a terminal suitable for the method for sending configuration described in any of the above embodiments. The terminal may be a multi-card terminal or a non multi-card terminal.

As shown in FIG. 7, the method for sending configuration may include the following steps.

In step S701, configuration information is sent to a terminal. The configuration information includes configuration, and is used by the terminal to receive broadcast information from a second base station according to the configuration and determine capability information of the second base station to solve a multi-card problem according to the broadcast information, when the terminal is in an idle state.

In one embodiment, the first base station can send configuration information to the terminal, which includes configuration, such as time domain resources, frequency domain resources, period, duration, etc. When the terminal is in an idle state, it can receive broadcast information from the second base station according to the configuration information.

In one embodiment, the second base station is a base station other than the first base station, which may include one or more base stations, for example, a base station passed along by the terminal during movement. When the terminal is within the signal coverage range of the second base station, the terminal can receive information broadcasted by the second base station.

In one embodiment, the second base station can broadcast its own capability information of solving multi-card problems, so that even when the terminal is in an idle state, it can receive the broadcast information from the second base station, and determine the capability of the second base station to solve multi-card problems based on the capability information of the second base station to solve multi-card problems obtained from the broadcast information.

In one embodiment, the second base station can not only broadcast its own capability information of solving multi-card problems, but also communicate with neighboring base stations of the second base station, obtain the capability information of neighboring base stations to solve multi-card problems, and then carry the capability information of neighboring base stations to solve multi-card problems in the broadcast information for broadcasting.

According to embodiments of the present disclosure, the terminal can obtain the capability information of the second base station to solve multi-card problems in an idle state based on the configuration of the first base station, thereby determining the capability of the second base station to solve multi-card problems.

Hence, when the terminal establishes a connection with a third base station (which may be the first base station, or may be other base stations) in the future (for example, the terminal resides in the range of the third base station or enters a connected state with the third base station), the obtained capability information can be sent to the third base station, so that the third base station can determine the capability of the second base station to solve the multi-card problem, which facilitates the third base station and the second base station collaboratively and more effectively solving the multi-card problem for the terminal.

For example, if a terminal connected to a third base station has a multi-card problem and requests the third base station to solve the multi-card problem, the third base station can determine whether it can solve the multi-card problem. If the third base station can solve the multi-card problem, it can provide feedback to the terminal to solve the multi-card problem. If the third base station cannot solve the multi-card problem, it can determine whether the second base station can solve the multi-card problem based on the received capability information of the second base station. If the second base station can solve the multi-card problem, the third base station can instruct the terminal to switch to accessing the second base station (including but not limited to residing in the second base station and establishing a connection with the second base station).

It should be noted that solving the multi-card problem collaboratively by the third base station and the second base station is not limited to the above way. For example, after receiving a request from the terminal to solve the multi-card problem, the third base station can determine its own load. If its own load exceeds the load threshold and the second base station can solve the multi-card problem reported by the terminal, the third base station can instruct the terminal to switch to accessing the second base station, to avoid excessive load due to self-solving multi-card problems.

In an embodiment, the configuration information is the Minimum of Drive Tests (MDT) configuration information, in which case, the terminal can receive broadcast information from the second base station according to the configuration in the configuration information during the process of MDT.

In one embodiment, the base station can instruct the terminal to receive the broadcast information from the second base station through the MDT configuration information. The terminal can receive the broadcast information from the second base station according to the configuration during the process of MDT.

That is, in the process of MDT, the terminal can not only perform measurement on the second base station, for example, measure the signal quality of the second base station, but also obtain the capability information of the second base station. Thus, after the completion of MDT, the terminal can not only obtain the measurement results of the base stations along the way, but also obtain the capability information of the base stations along the way to solve multi-card problems, expanding the terminal's functions in the idle state.

In an embodiment, MDT may include two types: one is Logged MDT, and the other is Immediate MDT. The following is an exemplary description with respect to Logged MDT.

In one embodiment, the configuration information may be carried in the LoggedMeasurementConfiguration signaling, which is used to indicate the configuration for MDT. For example, it may be as follows:

```
LoggedMeasurementConfiguration-r17-IEs ::=   SEQUENCE {
      MUSIMProbblemList-r17                        SetupRelease
{ MUSIMProbblemList-r17}      OPTIONAL,   --Need M
      }
``` indicating that the specific configuration information can be indicated by the information element MUSIMProblemList-r17 in the high signaling. After receiving the above signaling, the terminal can obtain the information element MUSIMProblemList-r17 from it, and then determine the configuration of receiving the broadcast information from the second base station based on the information element MUSIMProblemList-r17.

In one embodiment, the configuration information also includes a target type. When the type of multi-card problem that can be solved by the second base station belongs to the target type, the terminal can store the capability information.

In an embodiment, the first base station can indicate the target type to the terminal through the configuration information, allowing the terminal to store the capability information only when the type of multi-card problem that can be solved by the second base station belongs to the target type, thereby improving the control ability of the first base station over the terminal storing the capability information.

In one embodiment, the target type may be a type of multi-card problem that cannot be solved by the first base station. The first base station can determine the type of multi-card problem that cannot be solved by itself as the target type among all possible types of multi-card problems, and send it to the terminal in the configuration information.

In one embodiment, the target type includes at least one of: paging collision between a first SIM card and a second SIM card; or a need of switching to using a second SIM card for communication, while communicating using a first SIM card.

In one embodiment, a need of switching to using a second SIM card for communication, while communicating using a first SIM card, includes but not limited to following cases:

the communication operation of the first SIM card conflicts with monitoring the paging message by the second SIM card;

the communication operation of the first SIM card conflicts with responding to the paging message by the second SIM card;

the communication operation of the first SIM card conflicts with measuring signal of the second SIM card;

the communication operation of the first SIM card conflicts with receiving the system information of the second SIM card;

the communication operation of the first SIM card conflicts with tracking area update of the second SIM card.

It should be noted that the types of multi-card problems that can be solved by the second base station may be one or more of the above types, and will not be elaborated here.

FIG. 8 is a schematic flowchart of another method for sending configuration according to an embodiment of the present disclosure. As shown in FIG. 8, the method further includes:

in step S801, in response to establishing a connection with the base station, obtaining the capability information from the terminal.

In one embodiment, the first base station can obtain capability information from the terminal after establishing a connection with the terminal. For example, the terminal can automatically send the capability information of the second base station to solve the multi-card problem to the first base station, or after the first base station requests, the terminal can then send the capability information of the second base station to solve the multi-card problem to the first base station. Based on this, the first base station can determine the capability of the second base station to solve the multi-card problem, which is conducive to the collaboration between the first base station and the second base station to more effectively solve the multi-card problem for the terminal.

FIG. 9 is a schematic flowchart of yet another method for sending configuration according to an embodiment of the present disclosure. As shown in FIG. 9, obtaining the capability information from the terminal includes:

in step S901, receiving first indication information sent by the terminal;

in step S902, determining that the terminal stores the capability information and the second base station is able to solve the multi-card problem, according to the first indication information; and in step S903, sending second indication information to the terminal, wherein the second indication information is configured to instruct the terminal to send the capability information to the first base station.

In one embodiment, during the process of establishing a connection with the first base station, or after establishing a connection with the first base station, the terminal can send first indication information to the first base station to inform it that the terminal stores the capability information of the second base station.

For example, during the process of connecting with the first base station, the terminal sends the first indication information to the first base station. For 4G networks, the first indication information may be carried in at least one of the following Radio Resource Control (RRC) signaling:

RRC connection setup completion signaling (RRCConnectionSetupComplete);

RRC connection reconfiguration completion signaling (RRCConnectionReconfigurationComplete);

RRC connection reestablishment completion signaling (RRCConnectionReestablishmentComplete); or RRC connection resume completion signaling (RRCConnectionResumeComplete).

For 5G networks, the first indication information may be carried in at least one of the following Radio Resource Control (RRC) signaling:

RRC setup completion signaling (RRCSetupComplete);

RRC reconfiguration completion signaling (RRCReconfigurationComplete);

RRC reestablishment completion signaling (RRCReestablishmentComplete); or

RRC resume completion signaling (RRCResumeComplete).

In one embodiment, after receiving the first indication information, the first base station can determine whether to obtain the capability information of the second base station stored in the terminal according to needs. If it is determined that capability information needs to be obtained, second indication information can be sent to the terminal to instruct the terminal to send the stored capability information to the first base station. After receiving the second indication information, the terminal can then send the stored capability information to the first base station.

For example, the first base station may carry the second indication information in UEInformationRequest, which is the user equipment information request signaling. Correspondingly, the terminal may carry the capability information in UEInformationResponse, which is the user equipment information response signaling.

FIG. 10 is a schematic flowchart of yet another method for sending configuration according to an embodiment of the present disclosure. As shown in FIG. 10, sending the second indication information to the terminal includes:

in step S1001, determining a type of multi-card problem that can be solved by the second base station according to the capability information; and in step S1002, in response to the type of multi-card problem that can be solved by the second base station being different from the type of multi-card problem that can be solved by the first terminal, sending the second indication information to the terminal.

In one embodiment, the first base station can determine the type of multi-card problem itself can solve, and whether there is a difference compared with the type of multi-card problem that the second base station can solve.

If they are completely the same, it indicates that the second base station can solve the multi-card problem, and the first base station can also solve it, then there is no need to obtain the capability information of the second base station from the terminal to avoid wasting communication resources. When the type of multi-card problem that the first base station itself can solve is different (completely or partially different) from the type of multi-card problem that the second base station can solve, the second indication information is sent to the terminal to obtain the capability information of the second base station.

FIG. 11 is a schematic flowchart of yet another method for sending configuration according to an embodiment of the present disclosure. As shown in FIG. 11, the method further includes:

in step S1101, in response to receiving a multi-card problem reported by a multi-card terminal, solving the multi-card problem collaboratively with the second base station according to the capability information.

In one embodiment, when a multi-card terminal connected to the first base station has a multi-card problem, the first base station can be requested to solve the multi-card problem. In this case, the first base station can collaborate with the second base station to solve the multi-card problem based on the capability information of the second base station. The following provides two examples of collaborative methods, but the methods for solving the multi-card problem through collaboration between the first and second base stations are not limited to the following examples. Specific settings can be made as needed.

In one embodiment, the first base station can determine whether it can solve the multi-card problem. If it can solve the multi-card problem, it can provide feedback to the terminal a solution to the multi-card problem. If the multi-card problem cannot be solved, it can determine whether the second base station can solve the multi-card problem based on the received capability information of the second base station. If the second base station can solve the multi-card problem, it can instruct the terminal to switch to accessing the second base station (including but not limited to residing in the second base station and establishing a connection with the second base station).

In one embodiment, the first base station can also determine its own load. In the case where its own load exceeds the load threshold and the second base station is able to solve the multi-card problem reported by the terminal, even if the first base station can solve the received multi-card problem, it instructs the terminal to switch to the second base station to avoid causing the load to be too high due to solving the multi-card problem by itself.

Corresponding to the aforementioned embodiments of the method for obtaining capability information and the method for sending configuration, this disclosure also provides embodiments of an apparatus for obtaining capability information and an apparatus for sending configuration.

FIG. 12 is a schematic block diagram of an apparatus for obtaining capability information according to an embodiment of the present disclosure. The apparatus for obtaining capability information shown in this embodiment can be applied to a terminal, which may be a multi-card terminal or a non multi-card terminal. The terminal includes but is not limited to a communication device such as a mobile phone, a tablet, a wearable device, a sensor, an Internet of Things device. The terminal can communicate with a base station as a user equipment. The base station includes but is not limited to a base station in a communication system, such as a 4G base station, a 5G base station, and a 6G base station.

As shown in FIG. 12, the apparatus for obtaining capability information may include:

a configuration receiving module 1201, configured to receive configuration information from a first base station;

a broadcast receiving module 1202, configured to receive broadcast information from a second base station according to configuration in the configuration information, in response to determining that the apparatus is in an idle state; and a capability determining module 1203, configured to determine capability information of the second base station to solve a multi-card problem based on the broadcast information.

In some embodiments, the capability information includes at least one of:

being able to solve the multi-card problem;

being unable to solve the multi-card problem; or at least one type of the multi-card problem that can be solved.

Figure 13:
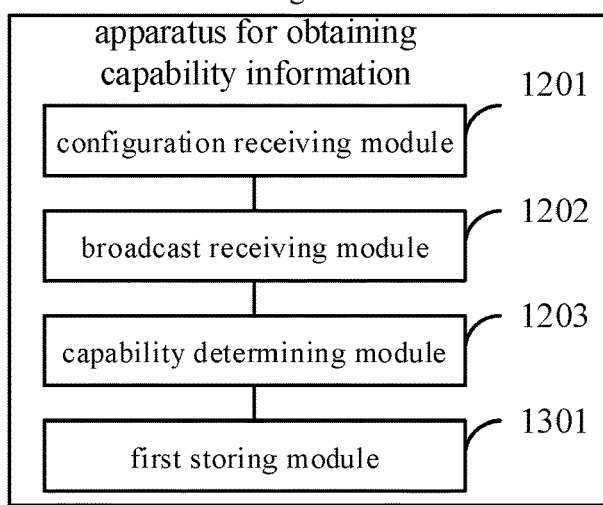
FIG. 13 is a schematic block diagram of another apparatus for obtaining capability information according to an embodiment of the present disclosure.

FIG. 13 is a schematic block diagram of another apparatus for obtaining capability information according to an embodiment of the present disclosure. As shown in FIG. 13, the apparatus further includes:

a first storing module 1301, configured to store the capability information, in response to the capability information including being able to solve the multi-card problem.

Figure 14:
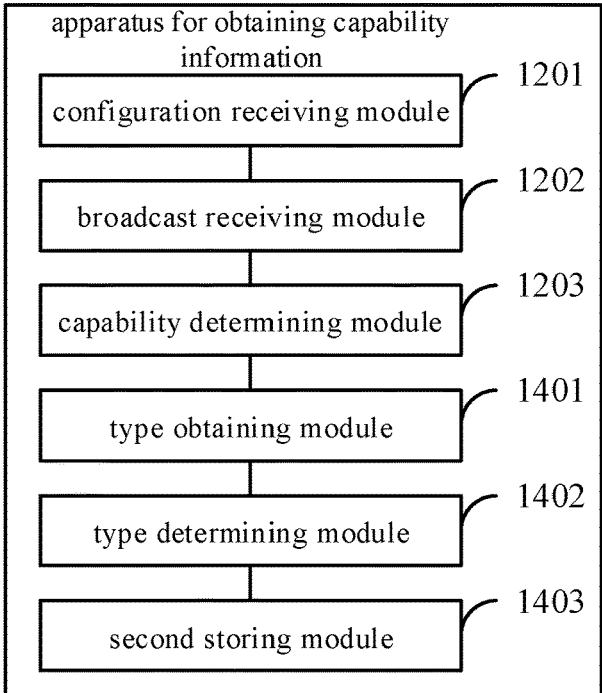
FIG. 14 is a schematic block diagram of yet another apparatus for obtaining capability information according to an embodiment of the present disclosure.

FIG. 14 is a schematic block diagram of yet another apparatus for obtaining capability information according to an embodiment of the present disclosure. As shown in FIG. 13, the apparatus further includes:

a type obtaining module 1401, configured to obtain a target type from the configuration information;

a type determining module 1402, configured to determine the type of the multi-card problem that can be solved by the second base station according to the broadcast information; and a second storing module 1403, configured to store the capability information, in response to the type of the multi-card problem that can be solved by the second base station belonging to the target type.

In some embodiments, the target type includes at least one of:

paging collision between a first SIM card and a second SIM card; or a need of switching to using a second SIM card for communication, while communicating using a first SIM card.

Figure 15:
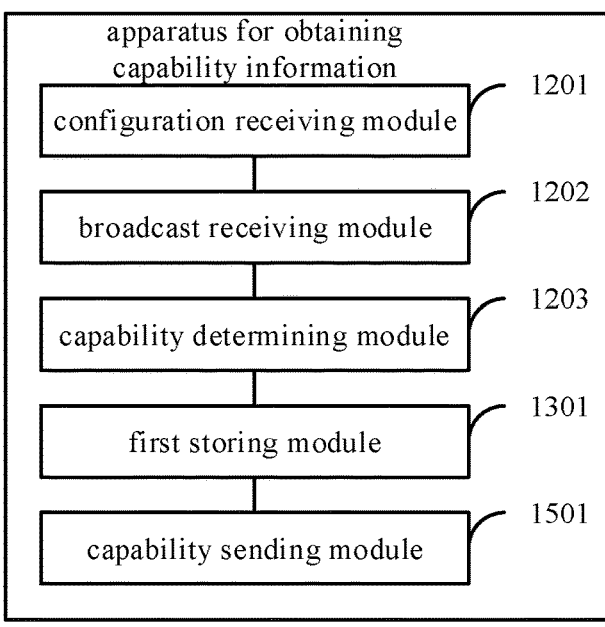
FIG. 15 is a schematic block diagram of yet another apparatus for obtaining capability information according to an embodiment of the present disclosure.

FIG. 15 is a schematic block diagram of yet another apparatus for obtaining capability information according to an embodiment of the present disclosure. As shown in FIG. 15, the apparatus further includes:

a capability sending module 1501, configured to send the capability information to a third base station, in response to establishing a connection with the third base station.

It should be noted that FIG. 15 only shows a block diagram based on the embodiment shown in FIG. 13. In practical applications, the capability sending module 1501 may also be implemented based on the embodiment shown in FIG. 14.

In some embodiments, the capability sending module is configured to send first indication information to the third base station, wherein the first indication information is configured to indicate that the terminal stores the capability information and the second base station is able to solve the multi-card problem; and in response to receiving second indication information sent by the third base station, send the capability information to the third base station.

In some embodiments, the broadcast receiving module is configured to receive the broadcast information from the second base station according to the configuration in the configuration information during a process of Minimum of Drive Tests.

Figure 16:
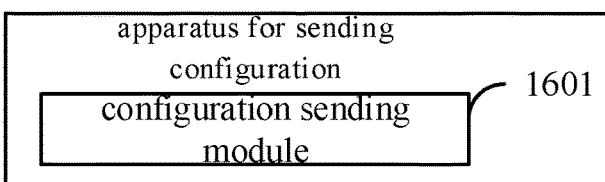
FIG. 16 is a schematic block diagram of an apparatus for sending configuration according to an embodiment of the present disclosure.

FIG. 16 is a schematic block diagram of an apparatus for sending configuration according to an embodiment of the present disclosure. The apparatus for sending configuration shown in this embodiment can be applied to a first base station, which includes but is not limited to a 4G base station, a 5G base station, and a 6G base station. The first base station can communicate with a terminal as a user equipment, which includes but is not limited to communication devices such as mobile phones, tablets, wearable devices, sensors, IoT devices, etc.

As shown in FIG. 16, the apparatus for sending configuration may include:

a configuration sending module 1601, configured to send configuration information to a terminal, wherein the configuration information comprises configuration, and is used by the terminal to receive broadcast information from a second base station according to the configuration and determine capability information of the second base station to solve a multi-card problem according to the broadcast information, when the terminal is in an idle state.

In some embodiments, the configuration information further includes a target type, and the target type is used by the terminal so that the terminal stores the capability information when a type of the multi-card problem that can be solved by the second base station belongs to the target type.

In some embodiments, the target type includes at least one of:

paging collision between a first SIM card and a second SIM card; or a need of switching to using a second SIM card for communication, while communicating using a first SIM card.

Figure 17:
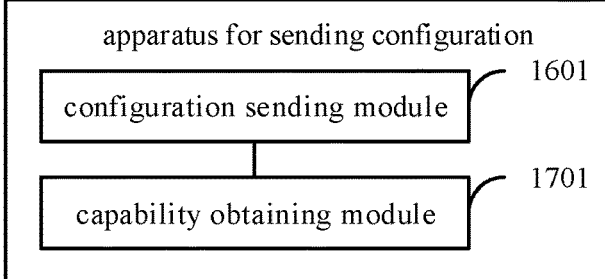
FIG. 17 is a schematic block diagram of another apparatus for sending configuration according to an embodiment of the present disclosure.

FIG. 17 is a schematic block diagram of another apparatus for sending configuration according to an embodiment of the present disclosure. As shown in FIG. 17, the apparatus further includes:

a capability obtaining module 1701, configured to obtain the capability information from the terminal, in response to establishing a connection with the base station.

In some embodiments, the capability obtaining module is configured to receive first indication information from the terminal; determine that the terminal stores the capability information and the second base station is able to solve the multi-card problem, according to the first indication information; and send second indication information to the terminal, wherein the second indication information is configured to instruct the terminal to send the capability information to the first base station.

In some embodiments, the capability obtaining module is configured to determine a type of the multi-card problem that can be solved by the second base station; and send the second indication information to the terminal, in response to the type of the multi-card problem that can be solved by the second base station being different from a type of the multi-card problem that can be solved by the first terminal.

Figure 18:
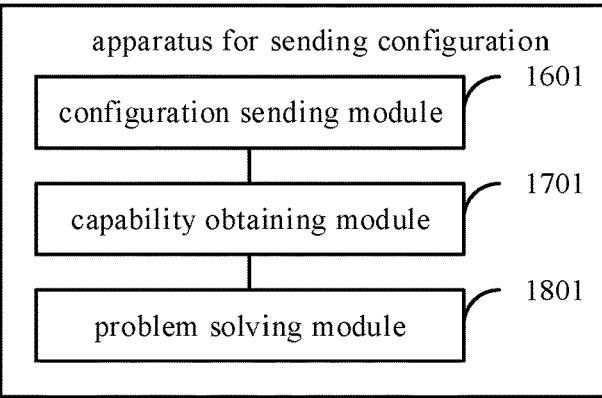
FIG. 18 is a schematic block diagram of yet another apparatus for sending configuration according to an embodiment of the present disclosure.

FIG. 18 is a schematic block diagram of yet another apparatus for sending configuration according to an embodiment of the present disclosure. As shown in FIG. 18, the apparatus further includes:

a problem solving module 1801, configured to collaboratively solve a multi-card problem with the second base station according to the capability information, in response to receiving the multi-card problem reported by a multi-card terminal.

In some embodiments, the configuration information is Minimization of Drive Tests configuration information.

Regarding the apparatuses in the above embodiments, the specific ways in which each module performs operations have been described in detail in the relevant method embodiments, and will not be elaborated here.

For apparatus embodiments, since they basically correspond to method embodiments, please refer to the partial explanation of method embodiments for relevant information. The apparatus embodiments described above are only illustrative, where the modules described as separate components may be or may not be physically separated, and the components shown as modules may be or may not be physical modules, which can be located in one place or distributed across multiple network modules. Some or all modules can be selected according to actual needs to achieve the purpose of embodiments of the present disclosure. Ordinary skilled in the art can understand and implement without creative labor.

Embodiments of the present disclosure further provide a communication device, including:

a processor; and a memory configured to store a computer program, wherein the processor is configured to implement the method for obtaining capability information described in any of above embodiments, and/or the method for sending configuration described in any of above embodiment, when the computer program is executed by a processor.

Embodiments of the present disclosure further provide a computer readable storage medium, configured for storing a computer program, which when executed by a processor, implements steps in the method for obtaining capability information described in any of above embodiments and/or the method for sending configuration described in any of above embodiments.

Figure 19:
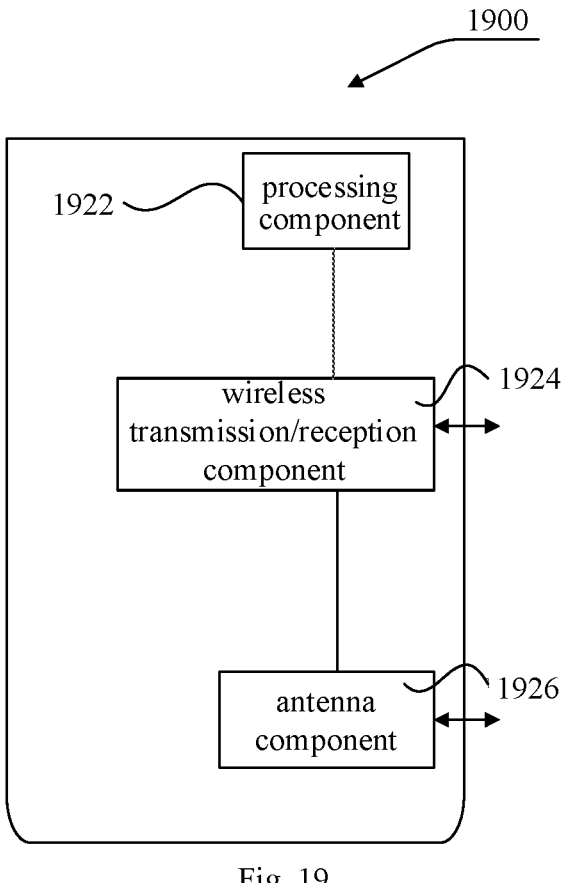
FIG. 19 is a schematic block diagram of an apparatus for sending configuration according to an embodiment of the present disclosure.

FIG. 19 is a schematic block diagram of an apparatus 1900 for sending configuration according to an embodiment of the present disclosure. The apparatus 1900 can be provided as a base station. Referring to FIG. 19, the apparatus 1900 includes a processing component 1922, a wireless transmission/reception component 1924, an antenna component 1926, and a signal processing section unique to the wireless interface. The processing component 1922 may further include one or more processors. One of the processors in the processing component 1922 can be configured to implement the method for resource configuration described in any of the above embodiments.

Figure 20:
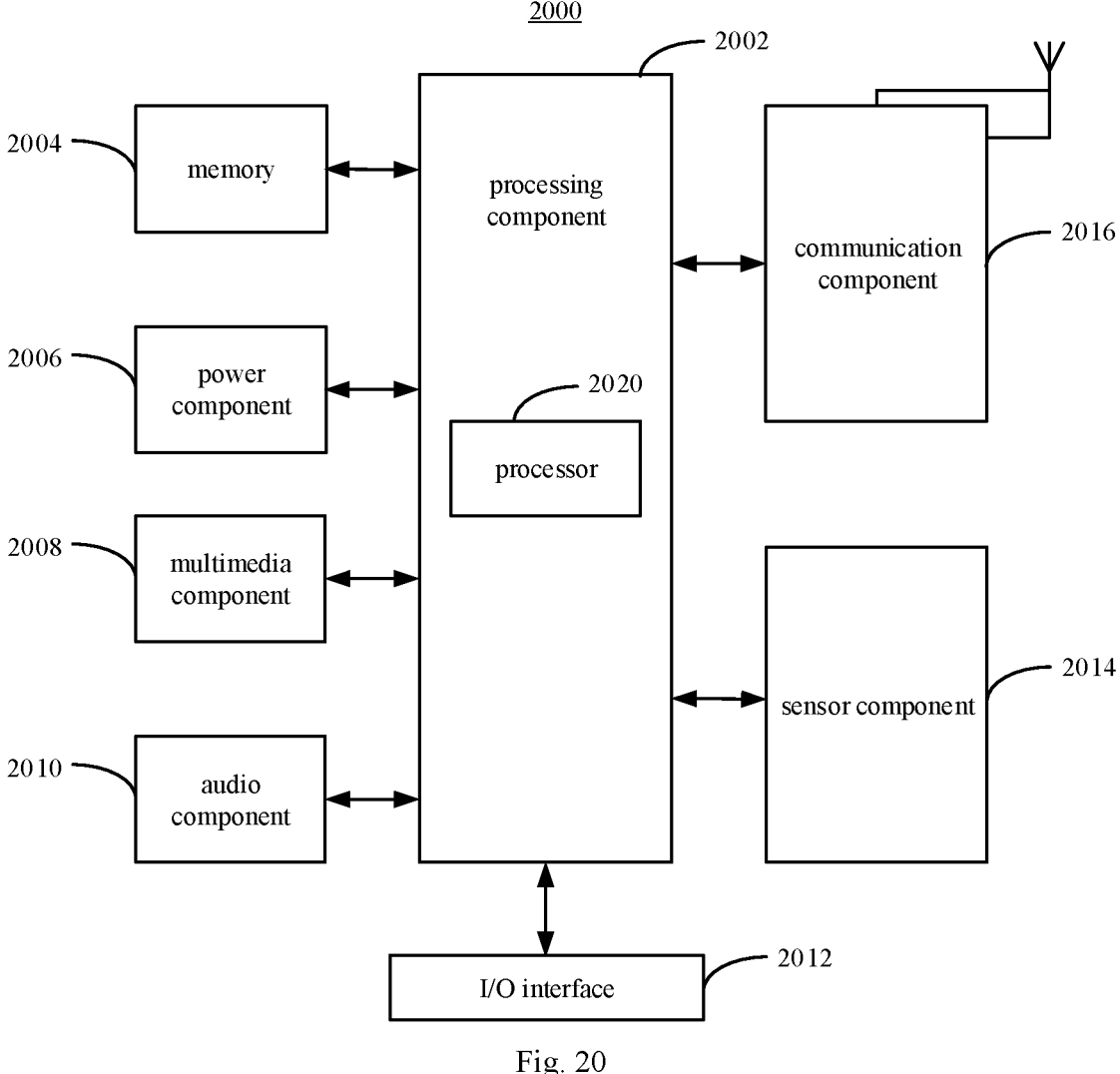
FIG. 20 is a schematic block diagram of an apparatus for obtaining capability information according to an embodiment of the present disclosure.

FIG. 20 is a schematic block diagram of an apparatus 2000 for obtaining capability information according to an embodiment of the present disclosure. For example, the apparatus 2000 may be a mobile phone, a computer, a digital broadcasting terminal, a message transceiver device, a game console, a tablet device, a medical device, a fitness device, a personal digital assistant, etc.

Referring to FIG. 20, the apparatus 2000 may include one or more of the following components: a processing component 2002, a memory 2004, a power component 2006, a multimedia component 2008, an audio component 2010, an input/output (I/O) interface 2012, a sensor component 2014, and a communication component 2016.

The processing component 2002 typically controls overall operations of the apparatus 2000, such as the operations associated with display, telephone calls, data communications, camera operations, and recording operations. The processing component 2002 may include one or more processors 2020 to execute instructions to perform all or part of the steps in the above-described HARQ-ACK feedback methods. Moreover, the processing component 2002 may include one or more subcomponents which facilitate the interaction between the processing component 2002 and other components. For instance, the processing component 2002 may include a multimedia subcomponent to facilitate the interaction between the multimedia component 2008 and the processing component 2002.

The memory 2004 is configured to store various types of data to support the operation of the apparatus 2000. Examples of such data include instructions for any applications or methods operated on the apparatus 2000, contact data, phonebook data, messages, pictures, video, etc. The memory 2004 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 2006 provides power to various components of the apparatus 2000. The power component 2006 may include a power management system, one or more power sources, and any other components associated with the generation, management, and distribution of power in the apparatus 2000.

The multimedia component 2008 includes a screen providing an output interface between the apparatus 2000 and the user. In some embodiments, the screen may include a liquid crystal display (LCD) and a touch panel (TP). If the screen includes a touch panel, the screen can be implemented as a touch screen to receive input signals from the user. The touch panel includes one or more touch sensors to sense touch, sliding, and gestures on the touch panel. The touch sensor can not only sense the boundaries of touch or sliding actions, but also detect the duration and pressure related to the touch or sliding operation. In some embodiments, the multimedia component 2008 includes a front camera and/or a rear camera. The front camera and the rear camera may receive an external multimedia datum while the apparatus 2000 is in an operation mode, such as a photographing mode or a video mode. Each of the front camera and the rear camera may be a fixed optical lens system or have focus and optical zoom capability.

The audio component 2010 is configured to output and/or input audio signals. For example, the audio component 2010 includes a microphone ("MIC") configured to receive an external audio signal when the apparatus 2000 is in an operation mode, such as a call mode, a recording mode, and a voice recognition mode. The received audio signal may be further stored in the memory 2004 or transmitted via the communication component 2016. In some embodiments, the audio component 2010 further includes a speaker to output audio signals.

The I/O interface 2012 provides an interface between the processing component 2002 and peripheral interface components, such as a keyboard, a click wheel, buttons, and the like. The buttons may include, but are not limited to, a home button, a volume button, a starting button, and a locking button.

The sensor component 2014 includes one or more sensors to provide status assessments of various aspects of the apparatus 2000. For instance, the sensor component 2014 may detect an open/closed status of the apparatus 2000, relative positioning of components, e.g., the display and the keypad, of the apparatus 2000, a change in position of the apparatus 2000 or a component of the apparatus 2000, a presence or absence of user contact with the apparatus 2000, an orientation or an acceleration/deceleration of the apparatus 2000, and a change in temperature of the apparatus 2000. The sensor component 2014 may include a proximity sensor configured to detect the presence of nearby objects without any physical contact. The sensor component 2014 may also include a light sensor, such as a CMOS or CCD image sensor, for use in imaging applications. In some embodiments, the sensor component 2014 may also include an accelerometer sensor, a gyroscope sensor, a magnetic sensor, a pressure sensor, or a temperature sensor.

The communication component 2016 is configured to facilitate communication, wired or wirelessly, between the apparatus 2000 and other devices. The apparatus 2000 can access a wireless network based on a communication standard, such as WiFi, second generation (2G), third generation (3G), fourth generation (4G), fifth generation (5G) or sixth generation (6G), or a combination thereof. In one some embodiment, the communication component 2016 receives a broadcast signal or broadcast associated information from an external broadcast management system via a broadcast channel. In one some embodiment, the communication component 2016 further includes a near field communication (NFC) component to facilitate short-range communications. For example, the NFC component may be implemented based on a radio frequency identification (RFID) technology, an infrared data association (IrDA) technology, an ultra-wideband (UWB) technology, a Bluetooth (BT) technology, and other technologies.

In some embodiments, the apparatus 2000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer readable storage medium including instructions, such as included in the memory 2004, executable by the processor 2020 in the apparatus 2000, for performing the above-described HARQ-ACK feedback methods. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed herein. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

It should be noted that in this disclosure, relational terms such as first and second are only used to distinguish one entity or operation from another entity or operation, and do not necessarily require or imply any actual relationship or order between these entities or operations. The terms 'including', 'comprising', or any other variation thereof are intended to encompass non-exclusive inclusion, such that a process, method, item, or device that includes a series of elements not only includes those elements, but also other elements that are not explicitly listed, or also include elements inherent in such a process, method, item, or device. Without further limitations, the elements limited by the statement "including a . . . " do not exclude the existence of other identical elements in the process, method, item, or device that includes the said element.

The above provides a detailed introduction to the methods and apparatuses provided by embodiments of the present disclosure. Specific examples are applied in this disclosure to explain the principles and implementations of the present disclosure. The explanations of the above embodiments are only used to help understand the methods and core ideas of the present disclosure. Meanwhile, for those skilled in the art, there may be changes in specific implementation methods and application scope based on the ideas of this disclosure. In summary, the content of this specification should not be understood as a limitation of this disclosure.

What is claimed is:

1. A method for obtaining capability information, performed by a terminal, the method comprising:
   receiving configuration information from a first base station;
   receiving broadcast information from a second base station according to configuration in the configuration information, wherein the terminal is in an idle state, and the second base station is a base station other than the first base station; and
   determining capability information of the second base station to solve a multi-card problem according to the broadcast information, wherein the capability information indicates at least one of followings: being able to solve the multi-card problem, being unable to solve the multi-card problem, or at least one type of the multi-card problem that can be solved.

2. The method of claim 1, further comprising:
   storing the capability information, wherein the capability information indicates being able to solve the multi-card problem.

3. The method of claim 1, further comprising:
   obtaining a target type from the configuration information;
   determining the type of the multi-card problem that can be solved by the second base station according to the broadcast information;
   determining that the type of the multi-card problem that can be solved by the second base station belongs to the target type, and storing the capability information.

4. The method of claim 3, wherein the target type comprises at least one of followings:
   paging collision between a first SIM card and a second SIM card; or
   a need of switching to using the second SIM card for communication, while communicating using the first SIM card.

5. The method of claim 2, further comprising:
   in response to establishing a connection with a third base station, sending the capability information to the third base station.

6. The method of claim 5, wherein sending the capability information to the third base station comprises:
   sending first indication information to the third base station, wherein the first indication information is configured to indicate that the terminal stores the capability information and the second base station is able to solve the multi-card problem; and
   in response to receiving second indication information sent by the third base station, sending the capability information to the third base station.

7. The method of claim 1, wherein receiving the broadcast information from the second base station according to the configuration in the configuration information comprises:
   receiving the broadcast information from the second base station according to the configuration in the configuration information during a process of Minimum of Drive Tests.

8. A method for sending configuration, performed by a first base station, the method comprising:
   sending configuration information to a terminal, wherein the configuration information comprises configuration configured for the terminal to:
      receive broadcast information from a second base station according to the configuration when the terminal is in an idle state, wherein the second base station is a base station other than the first base station; and
      determine capability information of the second base station to solve a multi-card problem according to the broadcast information, wherein the capability information indicates at least one of followings: being able to solve the multi-card problem, being unable to solve the multi-card problem, or at least one type of the multi-card problem that can be solved.

9. The method of claim 8, wherein the configuration information further comprises a target type configured for the terminal to store the capability information when a type of the multi-card problem that can be solved by the second base station belongs to the target type.

10. The method of claim 9, wherein the target type comprises at least one of followings:
   paging collision between a first SIM card and a second SIM card; or
   a need of switching to using the second SIM card for communication, while communicating using the first SIM card.

11. The method of claim 10, further comprising:
   in response to establishing a connection with the second base station, obtaining the capability information of the second base station from the terminal.

12. The method of claim 11, wherein obtaining the capability information of the second base station from the terminal comprises:
   receiving first indication information from the terminal;
   determining that the terminal stores the capability information and the second base station is able to solve the multi-card problem, according to the first indication information; and
   sending second indication information to the terminal, wherein the second indication information is configured to instruct the terminal to send the capability information to the first base station.

13. The method of claim 12, wherein sending the second indication information to the terminal comprises:
   determining a type of the multi-card problem that can be solved by the second base station according to the capability information of the second base station;

determining that the type of the multi-card problem that can be solved by the second base station is different from a type of the multi-card problem that can be solved by the first base station; and sending the second indication information to the terminal.

14. The method of claim 11, further comprising:

in response to receiving a multi-card problem reported by a multi-card terminal, solving the multi-card problem by collaborating with the second base station according to the capability information of the second base station.

15. The method of claim 8, wherein the configuration information is Minimization of Drive Tests configuration information.

16. A terminal, comprising:

at least one processor; and a memory configured to store a computer program, wherein the at least one processor, by executing the computer program, is configured to:

receive configuration information from a first base station;

receive broadcast information from a second base station according to configuration in the configuration information, wherein the terminal is in an idle state, and the second base station is a base station other than the first base station; and determine capability information of the second base station to solve a multi-card problem according to the broadcast information, wherein the capability information indicates at least one of followings: being able to solve the multi-card problem, being unable to solve the multi-card problem, or at least one type of the multi-card problem that can be solved.

17. A base station, configured to implement the method of claim 8, comprising:

at least one processor; and a memory configured to store a computer program executable by the at least one processor.

* * * * *